(12) United States Patent
Endo

(10) Patent No.: US 11,093,808 B2
(45) Date of Patent: Aug. 17, 2021

(54) COLOR MATCHING METHOD, AND RECORDING MEDIUM HAVING COLOR MATCHING PROGRAM RECORDED THEREON

(71) Applicant: SCREEN HOLDINGS CO., LTD., Kyoto (JP)

(72) Inventor: Hiroki Endo, Kyoto (JP)

(73) Assignee: SCREEN HOLDINGS, CO., LTD., Kyoto (JP)

( * ) Notice: Subject to any disclaimer, the term of this patent is extended or adjusted under 35 U.S.C. 154(b) by 0 days.

(21) Appl. No.: 16/984,796

(22) Filed: Aug. 4, 2020

(65) Prior Publication Data

US 2021/0049429 A1  Feb. 18, 2021

(30) Foreign Application Priority Data

Aug. 16, 2019 (JP) .............................. JP2019-149442

(51) Int. Cl.
*G06K 15/00* (2006.01)
*G06K 15/02* (2006.01)
*G06K 15/10* (2006.01)

(52) U.S. Cl.
CPC ......... *G06K 15/027* (2013.01); *G06K 15/102* (2013.01); *G06K 15/407* (2013.01); *G06K 15/408* (2013.01)

(58) Field of Classification Search
CPC .. G06K 15/005; G06K 15/025; G06K 15/026; G06K 15/027; G06K 15/102; G06K 15/408; G06K 15/407; G06K 15/1878; G06F 3/1256; H04N 1/00045; H04N 1/6044; H04N 1/6055; H04N 2201/0005

USPC ........................................................ 358/504
See application file for complete search history.

(56) References Cited

U.S. PATENT DOCUMENTS

| 9,955,045 | B2 * | 4/2018 | Hayashi | ............. | H04N 1/00803 |
| 9,986,134 | B2 * | 5/2018 | Sugita | .................. | H04N 1/6055 |
| 2004/0085555 | A1 | 5/2004 | Kato | | |
| 2006/0170993 | A1 * | 8/2006 | Jacob | .................. | H04N 1/6011 |
| | | | | | 358/518 |

FOREIGN PATENT DOCUMENTS

| JP | 2004-098468 A | 4/2004 |
| JP | 2018-089844 A | 6/2018 |

* cited by examiner

*Primary Examiner* — Kent Yip
(74) *Attorney, Agent, or Firm* — McDermott Will & Emery LLP

(57) ABSTRACT

There is provided a color matching method including: step of, for each of segmented regions obtained by dividing a region of an entire color chart into a plurality of regions so that boundaries of the segmented regions are parallel to the feeding direction of the base material, determining average color difference between colorimetric values of a color chart outputted from the reference device and colorimetric values of a color chart outputted from the adjustment target device; a step of, taking a segmented region whose average color difference is minimum as the reference region, calculating difference values of the average color differences between the reference region and each of the segmented regions other than the reference region; and a step of specifying a segmented region whose difference value is equal to or greater than a predetermined threshold value as an abnormal region in which abnormality of a head is occurring.

12 Claims, 16 Drawing Sheets

Fig.16

| | | dL | da | db |
|---|---|---|---|---|
| C | LARGE | − | − − | − − |
| | SMALL | + | + + | + + |
| M | LARGE | − | + + | ? |
| | SMALL | + | − − | ? |
| Y | LARGE | − | − | + + |
| | SMALL | + | + | − − |
| K | LARGE | − − | ? | ? |
| | SMALL | + + | ? | ? |

Fig.22
PRIOR ART
|  | AVERAGE | MAXIMUM |
|---|---|---|
| FIRST TIME | dE=7.86 | dE=20.67 |
| SECOND TIME | dE=2.01 | dE=11.03 |
| THIRD TIME | dE=1.90 | dE=9.22 |
Fig.23
PRIOR ART
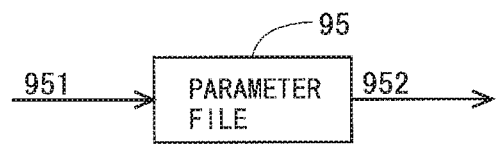
Fig.24
PRIOR ART
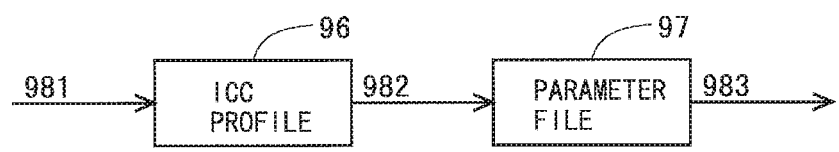

COLOR MATCHING METHOD, AND RECORDING MEDIUM HAVING COLOR MATCHING PROGRAM RECORDED THEREON

BACKGROUND OF THE INVENTION (1) Field of the Invention

The present invention relates to a method of color matching between two printing devices.

(2) Description of Related Art

Conventionally, in the field of printing devices, a process called "color matching" with which a plurality of devices are adjusted to print out the same color with respect to the same color sample. As shown in FIG. 20, the color matching is performed by comparing a color chart 93 obtained by causing an adjustment target device 91, which is a device to be adjusted, to print out a test pattern with a color chart 94 obtained by causing a reference device 92 that outputs a target color to print out a test pattern. Specifically, a color difference between the color chart 93 and the color chart 94 is determined based on a colorimetric result of the color chart 93 and a colorimetric result of the color chart 94, and parameters for color matching are adjusted so that the color difference is minimized as much as possible. Such color matching is performed when, for example, although a printing company introduces a new printing device, the same color output as an existing printing device is desired with respect to a predetermined printed material. In this example, the new printing device corresponds to the adjustment target device 91, and the existing printing device corresponds to the reference device 92.

In the meantime, in recent years, software for efficiently performing color matching (hereinafter referred to as "color matching software") is provided. According to the color matching software, parameters are automatically changed, based on the colorimetric results of the two color charts 93 and 94, so that the color difference between the color chart 94 and the color chart 93 obtained by the next printing becomes smaller.

Here, a procedure of a conventional color matching using color matching software will be described with reference to FIG. 21. First, the reference device 92 prints out a test pattern (Step S900), and colorimetry of the color chart 94 thus obtained is performed (Step S910). Next, the adjustment target device 91 prints out a test pattern (Step S920), and colorimetry of the color chart 93 thus obtained is performed (Step S930).

Subsequently, based on a colorimetric value obtained in Step S910 and a colorimetric value obtained in Step S930, a color difference dE, between the two color charts 93 and 94 is calculated (Step S940). By the process in the Step S940, for example, as shown in FIG. 22, an average color difference and a maximum color difference of a plurality of patches included in the color charts are determined. Then, it is determined, based on a result obtained in the Step S940, whether or not adjustment of parameters for color matching is necessary (whether or not the color differences are within an allowable range) (Step S950). The determination in the Step S950 is typically made based on experiences of a user (operator). In the Step S950, if it is determined that adjustment of parameters is necessary, the process proceeds to Step S960, and if it is determined that adjustment of parameters is not necessary, the process proceeds to Step S970. It should be noted that there is a case in which it is determined in the Step S950 that adjustment of the printing device (the adjustment target device 91) itself is necessary. In this case, the process for color matching is again performed after adjustment of the printing device itself.

In the Step S960, parameters are changed by color matching software. With this, when the adjustment target device 91 prints out a test pattern next time, conversion of image data 951 corresponding to the test pattern is performed using a parameter file 95 containing the changed parameters as shown in FIG. 23 (image data after the conversion is represented by reference number 952). After the Step S960 is completed, the process in and after the Step S920 is repeated until it is determined that "adjustment of parameters is not necessary" in the Step S950.

In the Step S970, parameters obtained in the Step S960 that is last performed are stored as parameters that are used in an actual operation of the adjustment target device 91. With this, the color matching is completed.

In an actual operation of the adjustment target device 91 after the completion of color matching, example, a process for correcting CMYK values is performed along with raster image processing (RIP) on submitted data in a CMYK form. In this regard, first, a process of correcting a first CMYK data 981 as the submitted data to a second CMYK data 982 performed using an ICC profile 96 used for printing by the reference device 92 (cf. FIG. 24). Then, using a parameter file 97 containing the parameters stored in the Step S970 in FIG. 21, a process of correcting the second CMYK data 982 to a third CMYK data 983 is performed (cf. FIG. 24) The printing by the adjustment target device 91 is performed using the third CMYK data 983. As described above, a printed material outputted from the adjustment target device 91 may have the same color as the material outputted from the reference device 92.

It should be noted that, regarding the present invention, the following prior art documents are known. Japanese Laid-Open Patent Publication No. 2018-89844 discloses the invention of a print control device including: a nozzle information obtaining unit that obtains a position of a defect nozzle; a determination unit that determines whether or not there is a defect nozzle among the patch print nozzles assigned to printing of patches; and a correcting unit that corrects a position of a patch print nozzle if there is a defect nozzle among the patch print nozzles. Further, Japanese Laid-Open Patent Publication No. 2004-98468 describes that colors displayed in a monitor are faithfully reproduced in printing. Specifically, it is described that a slight amount of an ink of C may be added when outputting an ink of Y or M, and a slight amount of the ink of Y may be added when outputting the ink of C.

However, according to the conventional method, determination of whether a result (color difference) obtained by the color matching process is an ideal result obtained by sufficient adjustment of parameters for color matching or there is room for improvement by adjusting a printer itself is made by a user. Therefore, when the user makes a wrong determination, this means that the color matching process is performed unnecessarily.

SUMMARY OF THE INVENTION

Thus, an object of the present invention is to provide a color matching method capable of preventing unnecessary execution of the color matching process.

One aspect of the present invention is directed to a color matching method for performing color matching between a reference device and an adjustment target device using color charts including a plurality of patches, the reference device being an ink-jet type printer, the adjustment target device being an ink-jet type printer having a plurality of heads arranged in a width direction vertical to a feeding direction of a base material, the method including:

a first colorimetry step of performing colorimetry of a first color chart outputted from the reference device;

a second colorimetry step of performing colorimetry of a second color chart outputted from the adjustment target device;

a representative value determination step of determining, for each of segmented regions obtained by dividing a region of an entire color chart into a plurality of regions so that each of boundaries of the segmented regions is parallel to the feeding direction of the base material, a representative value relating to color difference that is a difference between colorimetric values obtained in the first colorimetry step and colorimetric values obtained in the second colorimetry step;

a difference value calculating step of, taking a segmented region whose representative value is minimum as a reference region, calculating difference values of representative values between the reference region and each of the segmented regions other than the reference region; and an abnormal region specifying step of, based on the difference values calculated in the difference value calculating step, specifying an abnormal region in which abnormality of a head of the adjustment target device is occurring, wherein the segmented regions are set based on a position of the width direction of the plurality of heads, and in the abnormal region specifying step, a segmented region whose difference value calculated in the difference value calculating step is equal to or greater than a first threshold value is specified as the abnormal region.

According to the above configuration, when performing color matching, the entire region of the color chart is divided into a plurality of regions so that the boundaries between the segmented regions are parallel to the feeding direction of the base material (typically, printing paper), and then, the representative value (e.g., average color difference) relating to the color difference that is a difference between the colorimetric values obtained by colorimetry of the first color chart and the colorimetric values obtained by colorimetry of the second color chart is determined for each of the segmented regions. Then, a segmented region having a minimum representative value is set to the reference region, and difference values of the representative values between the reference region and each of the segmented regions other than the reference region are calculated. Based on the difference values, it is possible to determine whether or not there is an abnormal region in which abnormality of a head is occurring, without requiring determination based on experiences of the user. With this, it is possible to determine whether the color matching process should be performed or the printer (The adjustment target device) itself should be adjusted, more accurately as compared to the conventional example. As a result, it is possible to prevent unnecessary execution of color matching process when there is an abnormality in the head.

Another aspect of the present invention is directed to a non-transitory computer-readable recording medium having a color matching program recorded therein, the color matching program being for performing color matching between a reference device and an adjustment target device using color charts including a plurality of patches, the reference device being an ink-jet type printer, the adjustment target device being an ink-jet type printer having a plurality of heads arranged in a width direction vertical to a feeding direction of a base material, wherein the color matching program causes a computer to execute:

a representative value determination step of determining, for each of segmented regions obtained by dividing a region of an entire color chart into a plurality of regions so that each of boundaries of the segmented regions is parallel to the feeding direction of the base material, a representative value relating to color difference that is a difference between colorimetric values obtained by colorimetry of a first color chart outputted from the reference device and calorimetric values obtained by colorimetry of a second color chart outputted from the adjustment target device;

a difference value calculating step of, taking a segmented region whose representative value is minimum as a reference region, calculating difference values of representative values between the reference region and each of the segmented regions other than the reference region; and an abnormal region specifying step of, based on the difference values calculated in the difference value calculating step, specifying an abnormal region in which abnormality of a head of the adjustment target device is occurring, the segmented regions are set based on a position of the width direction of the plurality of heads, and in the abnormal region specifying step, a segmented region whose difference value calculated in the difference value calculating step is equal to or greater than a first threshold value is specified as the abnormal region.

These and other objects, features, modes, and advantageous effects of the present invention will become more apparent from the following detailed description of the present invention with reference to the accompanying drawings.

BRIEF DESCRIPTION OF THE DRAWINGS

FIG. 16 is a graph for illustration of a relationship between an L* value error, an a* value error, and a b* value error and amounts of used ink of four ink colors in a first modified example of the embodiment.

FIG. 22 is a diagram for illustration of a result obtained by calculation of a color difference in relation to the prior art.

FIG. 23 is a diagram for illustration of parameter change by the color matching software in relation to the prior art.

FIG. 24 is a diagram for illustration of data correction in an actual operation in relation to the prior art.

DETAILED DESCRIPTION OF PREFERRED EMBODIMENTS

Hereinafter, one embodiment of the present invention will be described with reference to the appended drawings.

1. ENTIRE CONFIGURATION OF PRINTING SYSTEM

Figure 1:
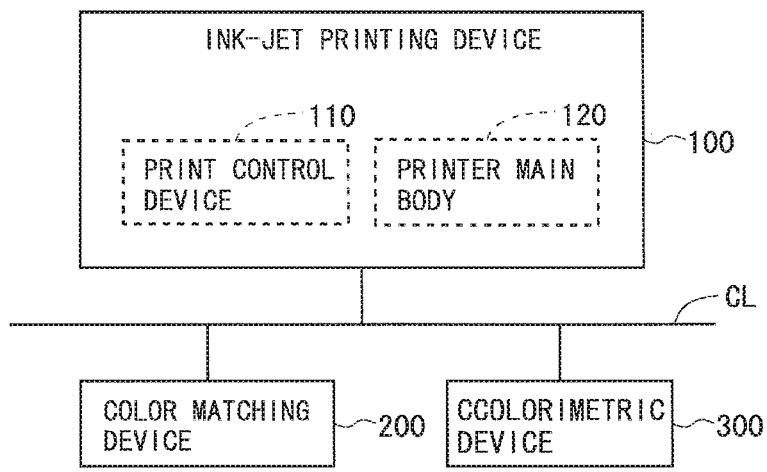
FIG. 1 is a diagram of an entire configuration of a printing system according to one embodiment of the present invention.

FIG. 1 is a diagram of an entire configuration of a printing system according to one embodiment of the present invention. The printing system is constituted by: an in jet printing device 100; a color matching device 200 for performing a color matching process; and r colorimetric device 300 for performing color measurement. The ink-jet printing device 100, the color matching device 200, and the colorimetric device 300 are connected to each other via a communication line CL. The ink-jet printing device 100 performs printing based on print data as digital data without using a printing plate. The ink-jet printing device 100 is constituted by: a printer main body 120; and a print control device 110 that controls the printer main body 120. Here, in this embodiment, it is assumed that a RIP processing for creating the print data used for printing by the ink-jet printing device 100 is performed by the color matching device 200.

Figure 2:
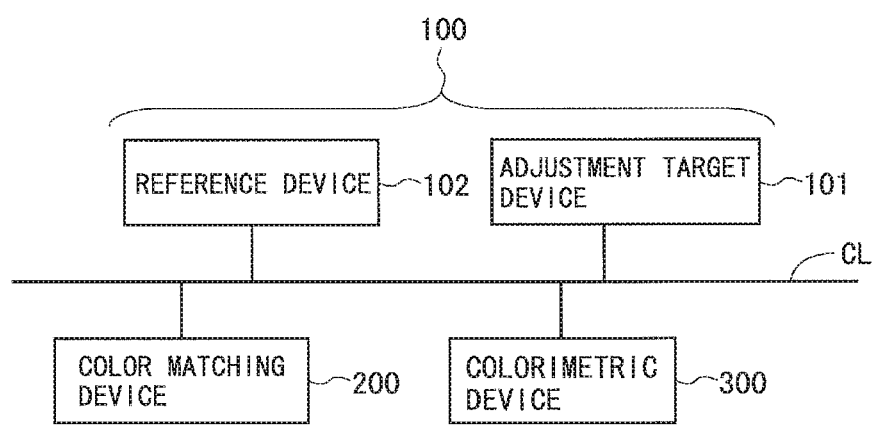
FIG. 2 is a block diagram for illustration of an ink-jet printing device included in the printing system in the embodiment.

As shown in FIG. 2, the printing system in this embodiment includes, as the ink-jet printing device 100, an adjustment target device 101 and a reference device 102. However, as long as a colorimetric result of a color chart obtained by the reference device 102 printing out a test pattern is stored in the color matching device 200 or the like, the reference device 102 may not be included in the printing system.

It should be noted that, as used herein, the color chart obtained by the adjustment target device 101 printing out the test pattern is referred to as a "adjustment chart", and the color chart obtained by the reference device 102 printing out the test pattern is referred to as a "reference chart".

2. CONFIGURATION OF INK-JET PRINTING DEVICE

Figure 3:
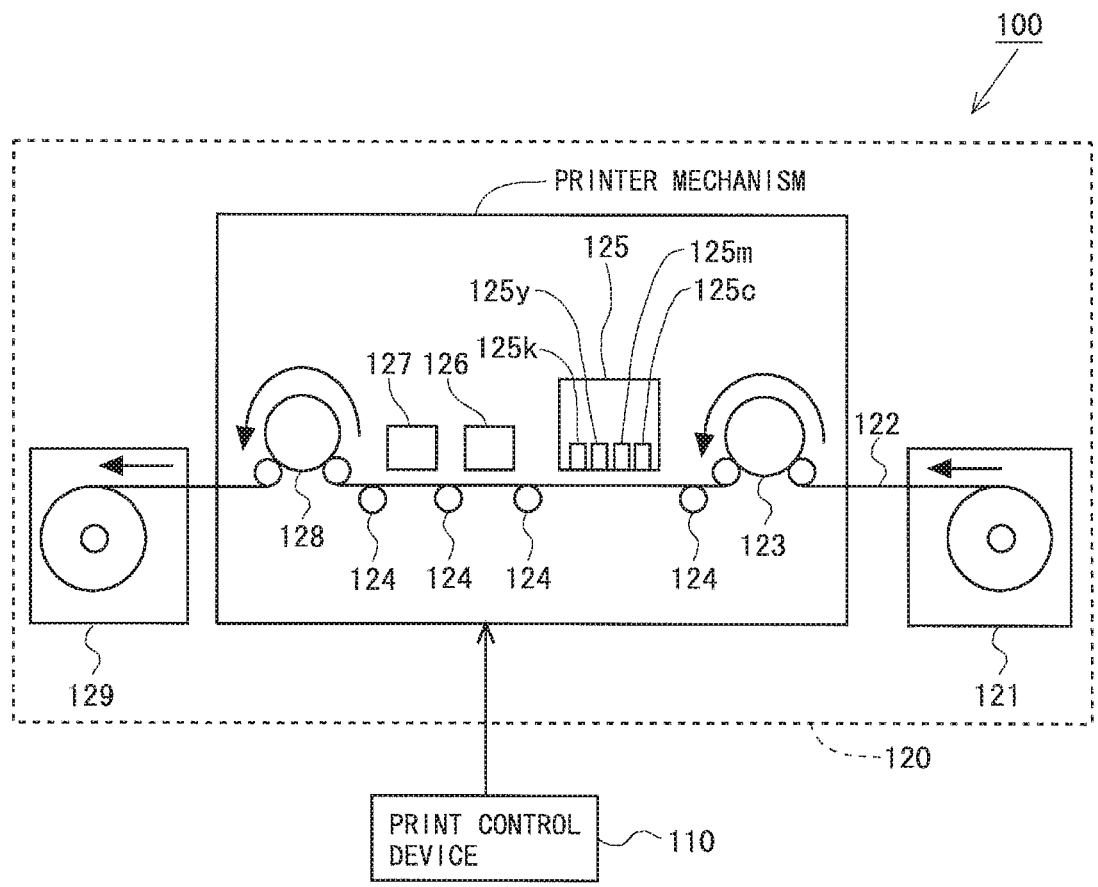
FIG. 3 is a schematic view illustrating one configuration example of the ink-jet printing device in the embodiment.

FIG. 3 is a schematic view illustrating one configurational example of the ink-jet printing device 100 (the adjustment target device 101) in this embodiment. As described above, the ink-jet printing device 100 includes: the printer main body 120; and the print control device 110 that controls the printer main body 120.

The printer main body 120 includes: a paper feed-out unit 121 for supplying a printing paper (e.g., a roll paper) 122 as a base material; a first driving roller 123 for transferring the printing paper 122 into a printer mechanism; a plurality of supporting rollers 124 for transferring the printing paper 122 within the printer mechanism; a printing unit 125 that performs printing by discharging an ink to the printing paper 122; a dryer unit 126 for drying the printing paper 122 after printing; an examination device 127 that examines a print condition of the printing paper 122; a second driving roller 128 for outputting the printing paper 122 from the printer mechanism; and a paper wind-up unit 129 for winding up the printing paper 122 after printing. In this manner, by the first driving roller 123 and the second driving roller 128, the printing paper 122 is transferred in a constant carrying direction from the paper feed-out unit 121 toward the paper wind-up unit 129.

Figure 4:
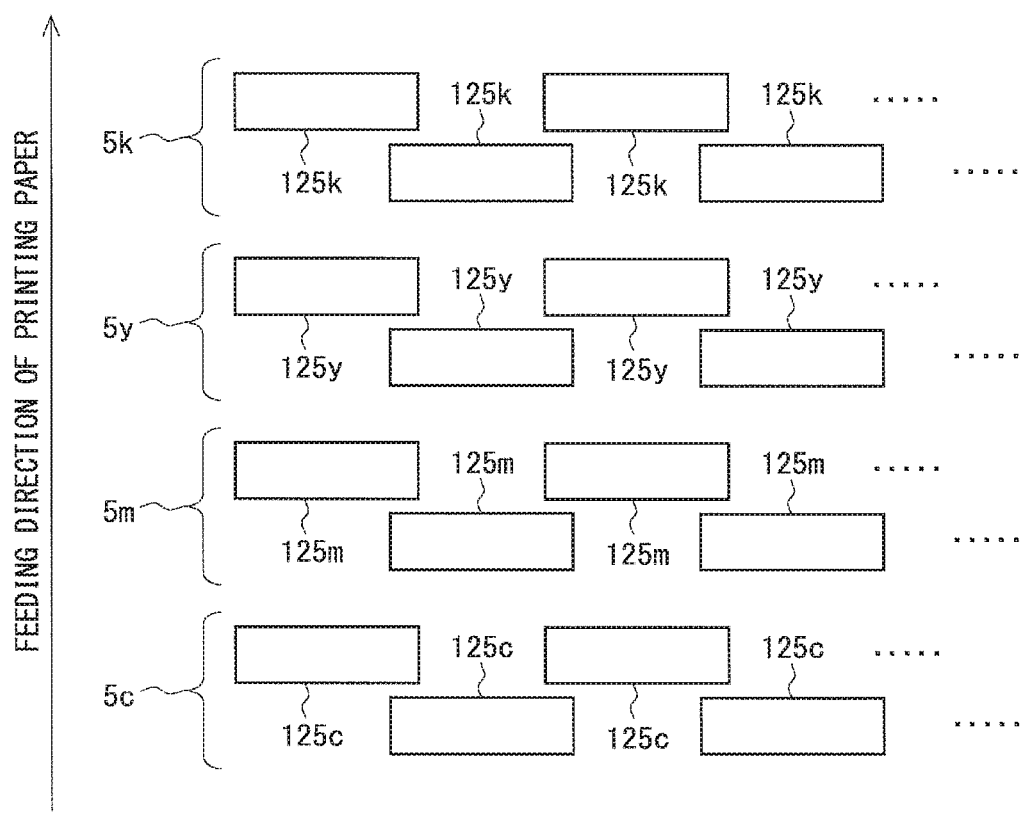
FIG. 4 is a plan view of a printing unit of the ink-jet printing device in the embodiment.

The printing unit 125 includes C ink-jet heads 125c, M ink-jet heads 125m, Y ink-jet heads 125y, and K ink-jet heads 125k, respectively discharging inks of C (cyan), M (magenta), Y (yellow), and K (black). FIG. 4 is a plan view of the printing unit 125. As shown in FIG. 4, the printing unit 125 is constituted by: a C ink discharge unit 5c having the plurality of C ink-jet heads 125c; a M ink discharge unit 5m having the plurality of N ink-jet heads 125m; a Y ink discharge unit 5y having the plurality of Y ink-jet heads 125y; and a K ink discharge unit 5k having the plurality of K ink-jet heads 125k. As can be seen from FIG. 4, regarding each of the ink colors, the plurality of ink-jet heads are arranged in a direction vertical to a feeding direction of the printing paper. Focusing on the C ink discharge unit 5c, for example, the plurality of C ink-jet heads 125c are arranged in a staggered arrangement so as to extend in the direction vertical to the feeding direction of the printing paper. This also applies to the M ink discharge unit 5m, the Y ink discharge unit 5y, and the K ink discharge unit 5k.

The print control device 110 controls an operation of the printer main body 120 thus configured. Upon supplying an instruction command for print output to the print control device 110, the print control device 110 controls an operation of the printer main body 120 so that the printing paper 122 is transferred from the paper feed-out unit 121 to the paper wind-up unit 129. Then, in the process of transfer of the printing paper 122, first, printing by discharging inks from the ink-jet heads 125c, 125m, 125y, and 125k within the printing unit 125 is performed, then drying of the printing paper 122 by the dryer unit 126 is performed, and finally, examination of a print condition is performed by the examination device 127.

3. HARDWARE CONFIGURATION OF COLOR MATCHING DEVICE

Figure 5:
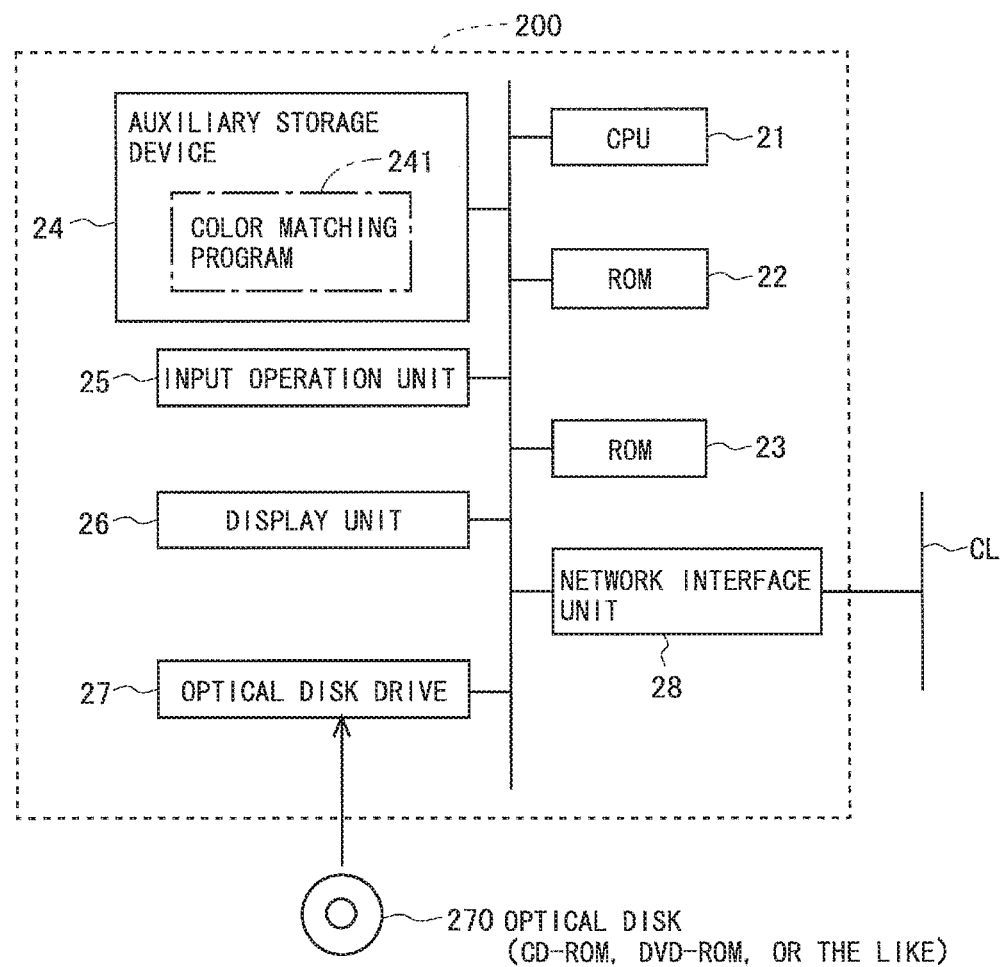
FIG. 5 is a diagram of a hardware configuration of a color matching device in the embodiment.

FIG. 5 is a diagram of a hardware configuration of the color matching device 200 in this embodiment. The color matching device 200 is realized by a personal computer, and includes: a CPU 21; a ROM 22; a RAM 23; an auxiliary storage device 24; an input operation unit 25 such as a keyboard; a display unit 26; an optical disk drive 27; and a network interface unit 28. Data (such as submitted manuscript data, and colorimetry data) transmitted through the communication line CL is inputted into the color matching device 200 via the network interface unit 28. The print data (data obtained by the RIP processing) created by the color matching device 200 is transmitted to the ink-jet printing device 100 via the network interface unit 28 through the communication line CL.

A color matching program 241 for performing the color matching process is stored in the auxiliary storage device 24. The color matching program 241 is provided being stored in a computer-readable recording medium such as a CD-ROM and a DVD-ROM. That is, for example, the user purchases an optical disk (such as a CD-ROM or a DVD-ROM) 270 as a recording medium of the color matching program 241 and sets the optical disk in the optical disk drive 27, and the color matching program 241 is read from the optical disk 270 and installed in the auxiliary storage device 24. Alternatively, the color matching program 241 transmitted through the communication line CL may be received by the network interface unit 28, and installed in the auxiliary storage device 24.

4. COLOR MATCHING METHOD

4.1 Outline

Figure 6:
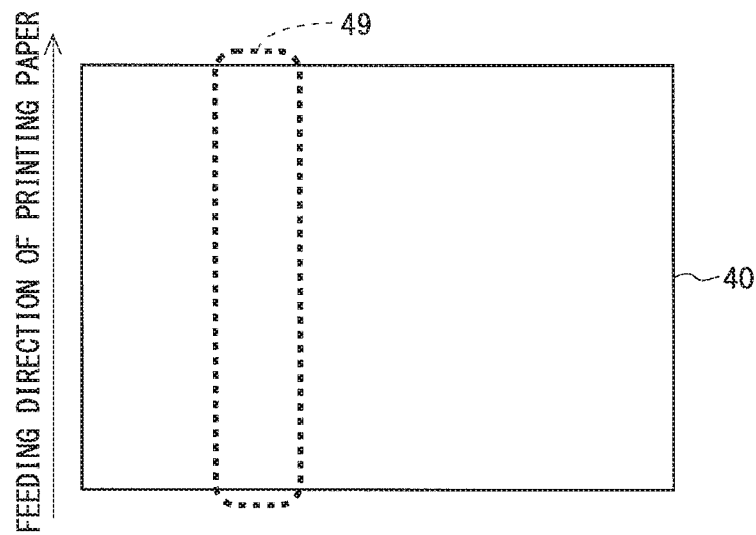
FIG. 6 is a view for illustration of an outline of a color matching process in the embodiment.

An outline of the color matching process in this embodiment will now be described. A color chart used for color matching includes a plurality of patches. Therefore, in the color matching process, data of a color difference (a color difference between a colorimetric value of the adjustment chart and a colorimetric value of the reference chart) is obtained for each of the patches. If patches having a large color difference are concentrated in a region represented by a reference number 49 in FIG. 6 out of an entire region 40 of the color chart regarding the above data of the color difference, it is considered to be highly possible that there is a trouble in the adjustment target device 101 at a portion corresponding to the region 49. Specifically, as the adjustment target device 101 has the plurality of ink-jet heads 125 arranged in a direction vertical to a paper feeding direction of the printing paper (hereinafter, "width direction"), if there is any trouble (e.g., ink discharge defect) in a specific one of the ink-jet heads 125, it is considered that a large number of patches having a large color difference occur in the paper feeding direction as indicated by the reference number 49. In such a case, it is considered that the color difference can be made smaller by appropriately adjusting the adjustment target device 101.

Figure 7:
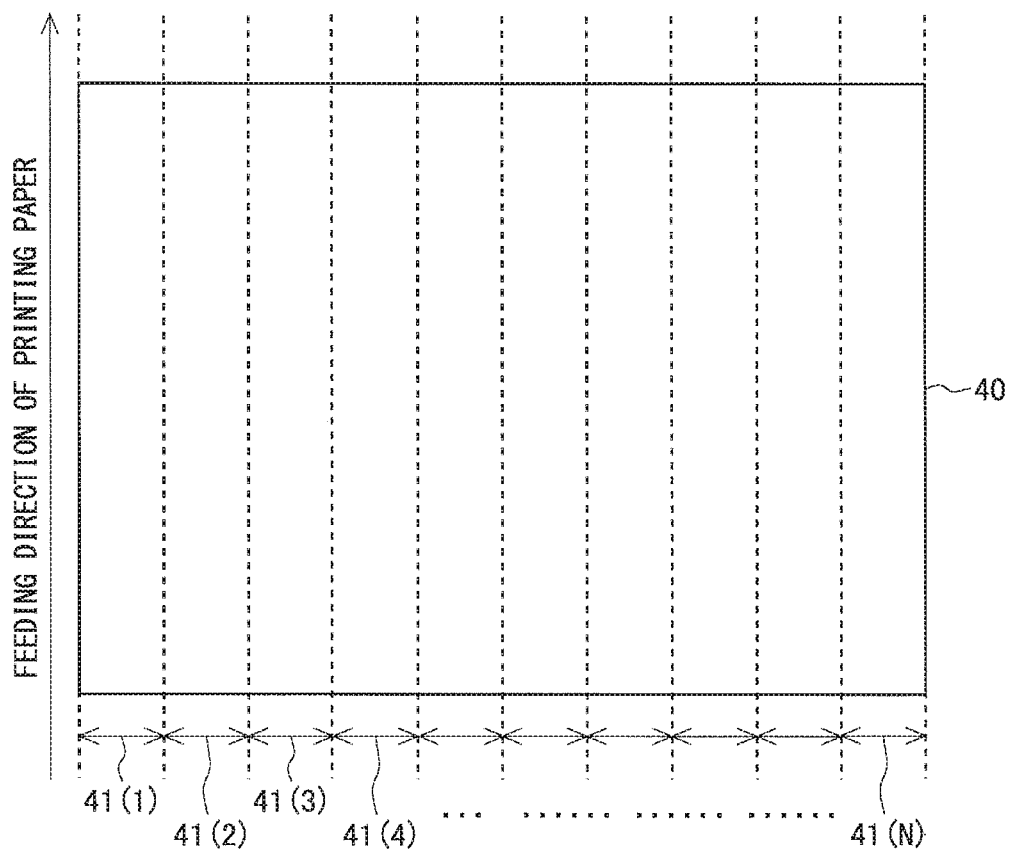
FIG. 7 is a view for illustration of an outline of the color matching process in the embodiment.

Therefore, in this embodiment, as shown in FIG. 7 the entire region 40 of the color chart is divided into a plurality of regions so that boundaries between segmented regions are parallel to the feeding direction of the printing paper. In the example shown in FIG. 7, N segmented regions 41(1) to 41(N) are formed by this division. The segmented regions 41(1) to 41(N) are set based on a position of the width direction of the plurality of ink-jet heads 125. Here, the segmented regions 41(1) to 41(N) and the plurality of ink-jet heads 125 may correspond in a one-to-one relationship, in a one-to-many relationship (one segmented region 41 is corresponding to the plurality of in: k-jet heads 125), or in a many-to-one relationship (the plurality of segmented regions 41 are corresponding to one ink-jet head 125). Then, an average color difference is determined for each of the segmented regions, and a segmented region whose average color difference is minimum is set as a reference region. Further, difference values of average color differences between the reference region and each of the segmented regions other than the reference region are calculated, and a segmented region whose difference value is equal to or greater than a predetermined threshold value is specified as an abnormal region (a region in which abnormality of a head of the adjustment target device 101 is occurring). As described above, the color matching process includes a process for detecting abnormality of the adjustment target device 101.

It should be noted that color matching software is used for a process itself for adjusting parameters for color matching based on the color differences. Further, in this embodiment, it is necessary to arrange the patches of the color chart so that amount of used inks of respective ink colors may not be greatly biased between the segmented regions.

4.2 Processing Procedure

Figure 8:
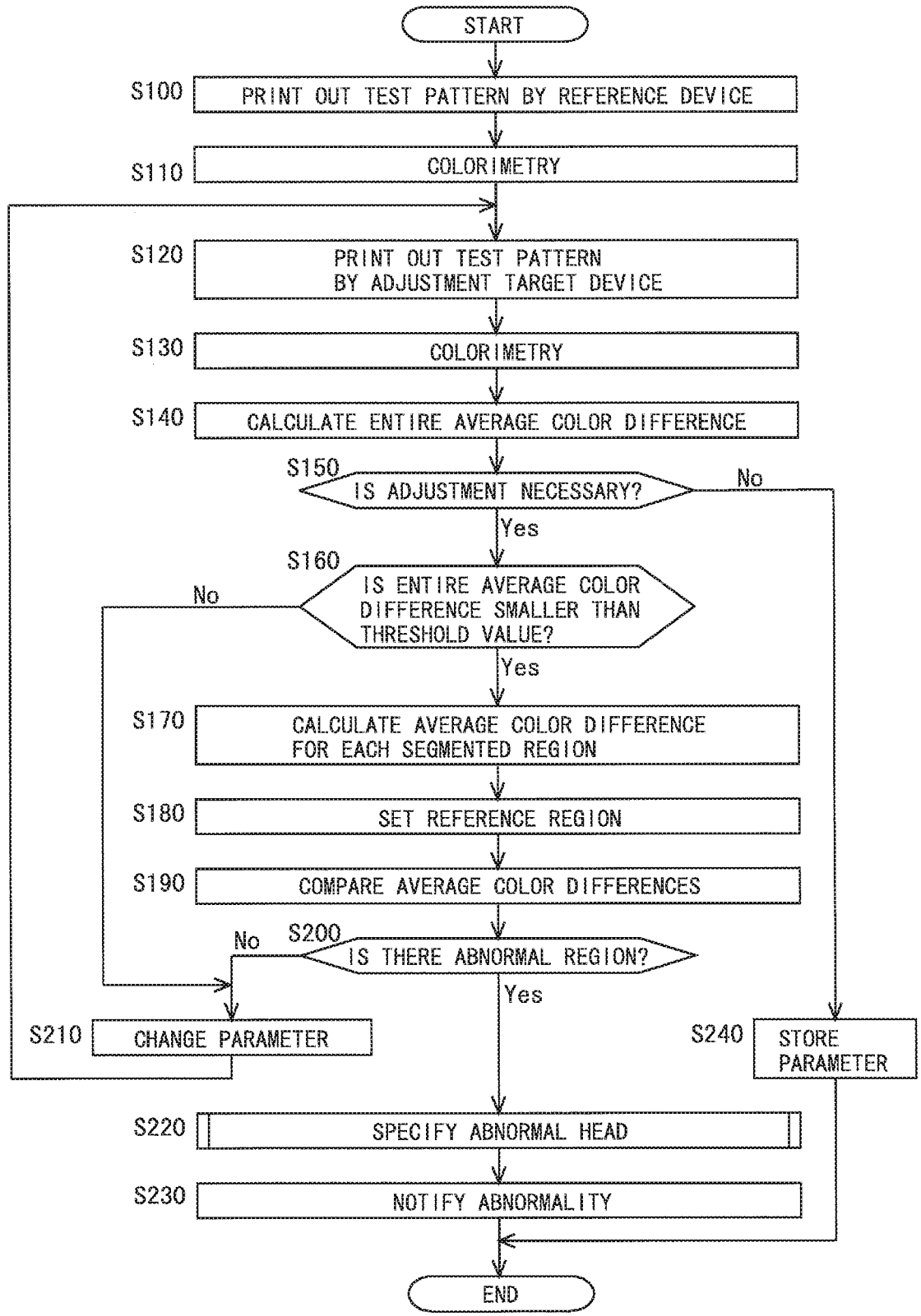
FIG. 8 is a flowchart showing a procedure of the color matching process in the embodiment.

FIG. 8 is a flowchart showing a procedure of the color matching process in this embodiment. First, the reference device 102 prints out a test pattern (Step S100), and colorimetry of a reference chart thus obtained is performed (Step S110). Next, the adjustment target device 101 prints out a test pattern (Step S120), and colorimetry of an adjustment chart thus obtained is performed (Step S130).

Thereafter, based on a colorimetric, value obtained in the Step S110 and a colorimetric value obtained in the Step S130, an average color difference is calculated for an entire region between the two color charts (Step S140). Then, based on a result obtained in the Step S140, it is determined whether or not adjustment of parameters for color matching is necessary (whether or not the color difference is within an allowable range) (Step S150). The determination in the Step S150 is typically made based on experiences of the user (operator). In the Step S150, if it is determined that adjustment of parameters is necessary, the process proceeds to Step S160, and if it is determined that adjustment of parameters is not necessary, the process proceeds to Step S240.

In the Step S160, it is determined whether or not the average color difference obtained in the Step S140 is smaller than the predetermined threshold value. It should be noted that the determination in the Step S160 may be made by the user (operator), or may be made automatically by the color matching program 241. In the Step S160, if it is determined that the average color difference is smaller than the predetermined threshold value, the process proceeds to Step S170, and if it is determined that the average color difference is not smaller than the predetermined threshold value, the process proceeds to Step S210. The reason why such a branch is provided in the process is because in a state in which the average color difference is large, it is not possible to accurately specify an abnormal region in the process from Steps S170 to S200 described below.

In the Step S170, the average color difference (the average value of the color differences of the colorimetric values obtained in the Step S110 and the colorimetric values obtained in the Step S130) for each of the segmented regions described above is calculated. In the example shown in FIG. 7, N average color differences are calculated in the Step S170. Then, a segmented region that corresponds to a minimum value among the average color differences calculated in the Step S170 is set as a reference region (Step S180). Thereafter, the average color differences are compared between each of the segmented regions other than the reference region and the reference region (Step S190). More specifically, in the Step S190, for each of the segmented regions other than the reference region, a difference value of the average color differences is calculated to the reference region.

Next, by comparing each of the difference values calculated in the Step S190 and the predetermined threshold value (first threshold value), it is determined whether or not there is an abnormal region (a region in which an abnormality of a head of the adjustment target device 101 is occurring) (Step S200). In the Step S200, a segmented region whose difference value calculated in the Step S190 is equal to or greater than the predetermined threshold value is specified as the abnormal region. In the Step S200, if it is determined that there is an abnormal region, the process proceeds to Step S220, and if it is determined that there is no abnormal region, the process proceeds to Step S210.

In the Step S210, parameters are changed by the color matching software, based on the color difference (the color difference between the colorimetric value obtained in the Step S110 and the colorimetric value obtained in the Step S130). After completion of the Step S210, the process returns to the Step S120, and the process in and after the Step S120 is repeated until is determined that adjustment of parameters is not necessary in the Step S150, or until it is determined that there is an abnormal region in the Step S200.

In the Step S220, a process for specifying an ink color of a head, out of heads (ink-jet heads) of ink colors corresponding to the abnormal region, in which abnormality is occurring is performed. Hereinafter, for convenience, an ink color of a head in which abnormality is occurring is referred to as an "abnormal ink color". That is, in the Step S220, a process for specifying an abnormal ink color is performed. It should be noted that a detailed procedure in the Step S220 will be described later.

Figure 9:
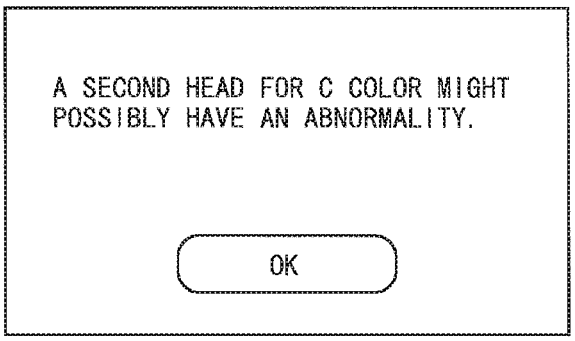
FIG. 9 is a view illustrating one example of a notification screen in the embodiment.

After specifying the abnormal head (specifying the abnormal ink color) in the Step S220, a notification screen relating to the abnormality is displayed in the display unit 26 of the color matching device 200 (Step S230). For example, notification screen as shown in FIG. 9 is displayed. With this, the user is able to grasp that the adjustment target device 101 should be adjusted before the color matching process is proceeded. It should be noted that, in place of displaying the notification screen in the display unit 26, for example, a similar notification screen may be printed out, or a notification mail may be sent to a previously registered mail address. As described above, it is preferable that a step for notifying abnormality in the adjustment target device 101 by explicitly showing the abnormal region specified in the Step S200 be included. After completion of the Step S230, the color matching process is once stopped. Then, the color matching process is performed again after the adjustment target device 101 itself is adjusted.

In the Step S240, the parameters obtained in the Step S210 that is last performed are stored as parameters That are used in an actual operation of the adjustment target device 101. With this, the color matching ends.

In this embodiment, a first colorimetry step is realized by the Step S110, a second colorimetry step is realized by the Step S130, a representative value determination step is realized by the Step S170, difference value calculating step is realized by the Step S190, an abnormal region specifying step is realized by the Step S200, an abnormal ink color specifying step is realized by the Step S220, and a notification step is realized by the Step S230. Further, in this embodiment, a first color chart is realized by the reference chart, and a second color chart is realized by the adjustment chart.

Figure 10:
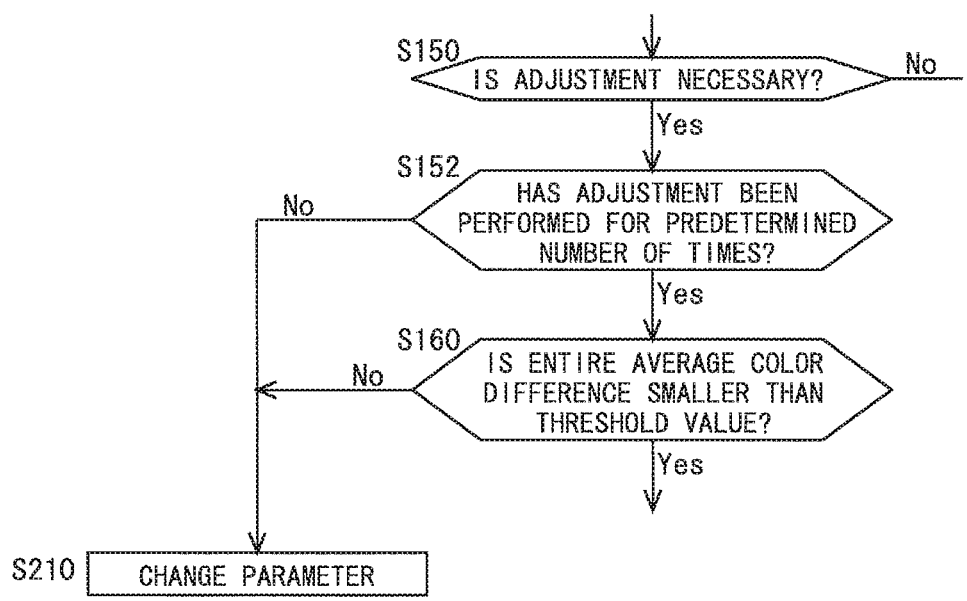
FIG. 10 is a chart for illustration of additional steps in the embodiment.

It should be noted that, as shown in FIG. 10, Step S152 described below may be provided between the Step S150 and the Step S160. In the Step S152, it is determined whether or not the adjustment of the parameters has been carried performed a predetermined number of times. Then, if the adjustment of the parameters has been performed for the predetermined number times, the process proceeds to the Step S160, and if the adjustment of the parameters has not been performed for the predetermined number of times, the process proceeds to Step S210 (that is, the process for determining whether or not there is an abnormal region is skipped). Such Step S152 may be provided, because when the number of times of adjustment of parameters is small, the average color difference is relatively large, and therefore it is not possible to accurately specify an abnormal region.

Figure 11:
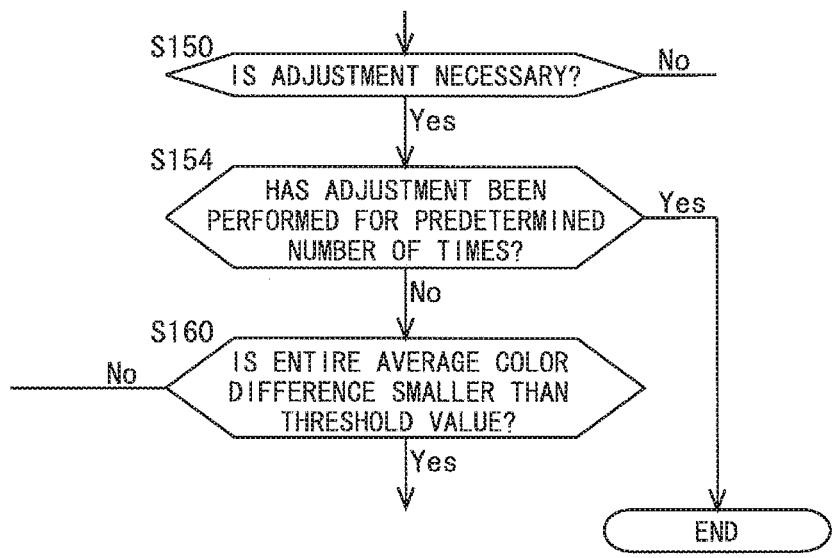
FIG. 11 is a chart for illustration of additional steps in the embodiment.

Further, as shown in FIG. 11, Step S154 described below may be provided between the Step S150 and the Step S160. In the Step S154, it is determined whether or not the adjustment of the parameters has been performed for a predetermined number of times (a previously determined maximum number of times) Then, if the adjustment of the parameters has been performed for the predetermined number of times, the process is terminated, and if the adjustment of the parameters has not been performed for the predetermined number of times, the process proceeds to the Step S160. It should be noted that, when the process is terminated by the determination in the Step S154, it is necessary to perform the color matching process again after performing adjustment of the adjustment target device 101 and the like. Such Step S154 may be provided, because when the number of times of adjustment of parameters reaches the previously determined maximum number of times, it is considered that there is an abnormality of some kind in the adjustment target device 101, and further adjustment of parameters would be wasted.

Figure 12:
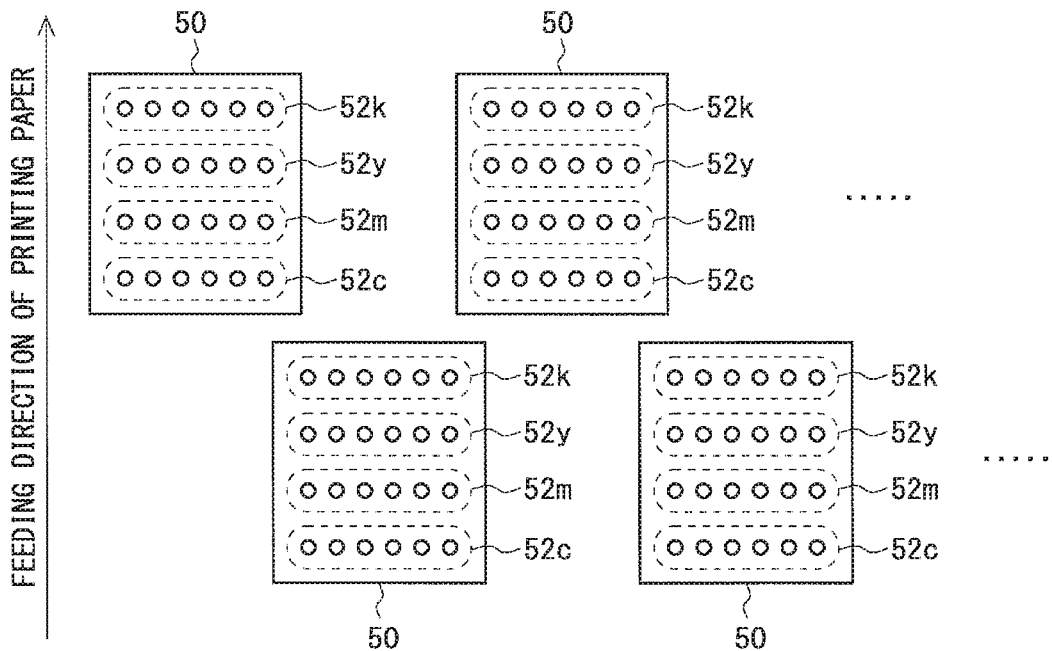
FIG. 12 is a view illustrating another configuration example of the printing unit in the embodiment.

In the meantime, in this embodiment, the printing unit 125 of the ink-jet printing device 100 has the configuration shown in FIG. 4. However, a configuration in which each head includes nozzle arrays for four ink colors (a C nozzle array 52c, an M nozzle array 52m, a Y nozzle array 52y, and a K nozzle array 52k) as shown in FIG. 12 can be employed. In this case, in the Step S220 of FIG. 8, an ink color of a nozzle array, out of nozzle arrays included in a head 50 corresponding to the abnormal region, in which abnormality is occurring is specified as an abnormal ink color.

4.3 Procedure of Process for Specifying Abnormal Head (Process for Specifying Abnormal Ink Color)

Figure 13:
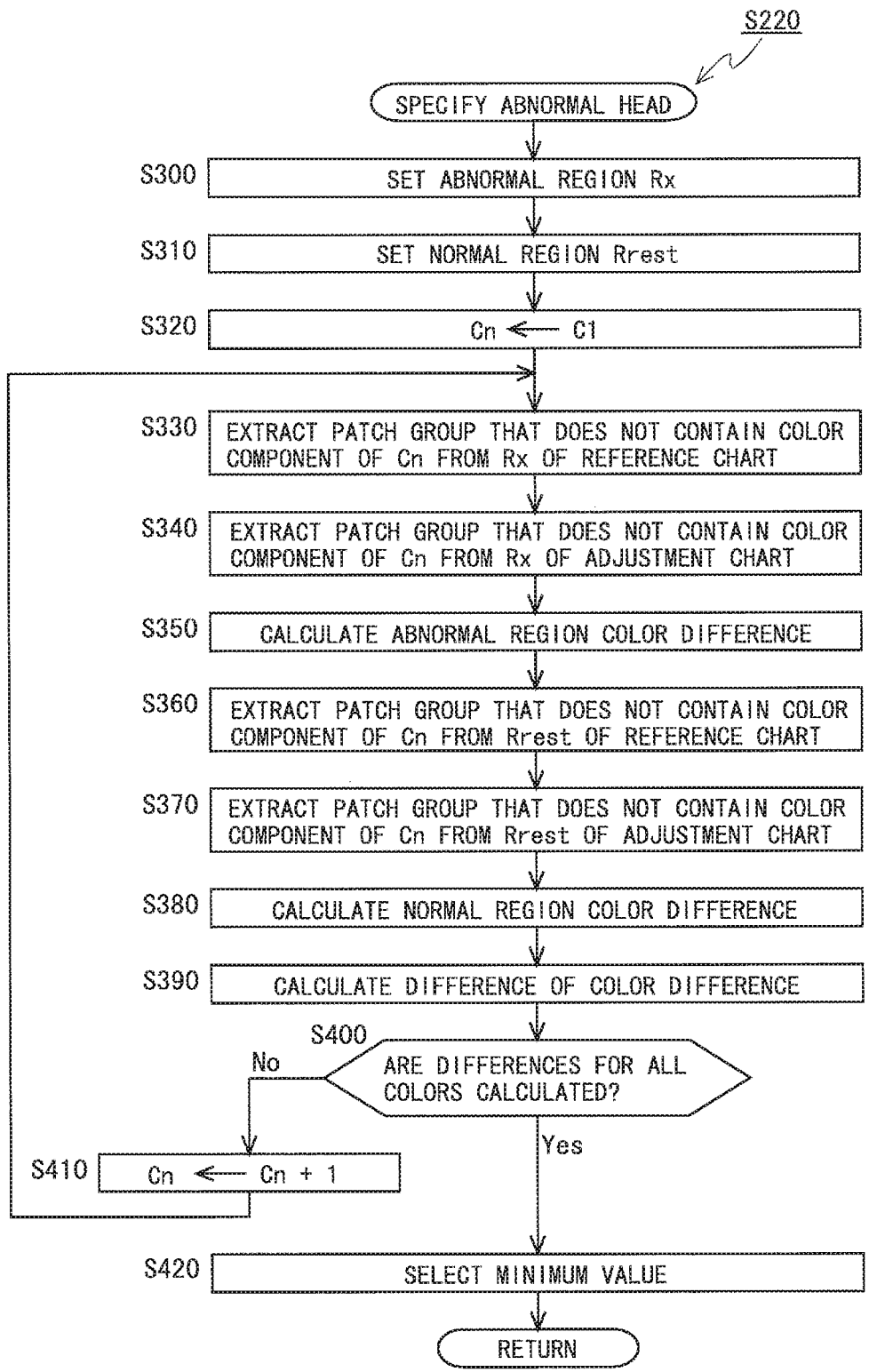
FIG. 13 is a flowchart showing a procedure of a process for specifying an ink color for which abnormality is occurring in a head in the embodiment.

With reference to a flowchart shown in FIG. 13, a procedure of a process for specifying an ink color for which abnormality is occurring in a head (a process in the Step S220 of FIG. 8) will be described. As an outline, in this process, a patch group that does not include a specific ink color is extracted, and whether or not there is an abnormality in head of target ink color is determined based on whether or not the extracted patch group is normally printed out.

Figure 14:
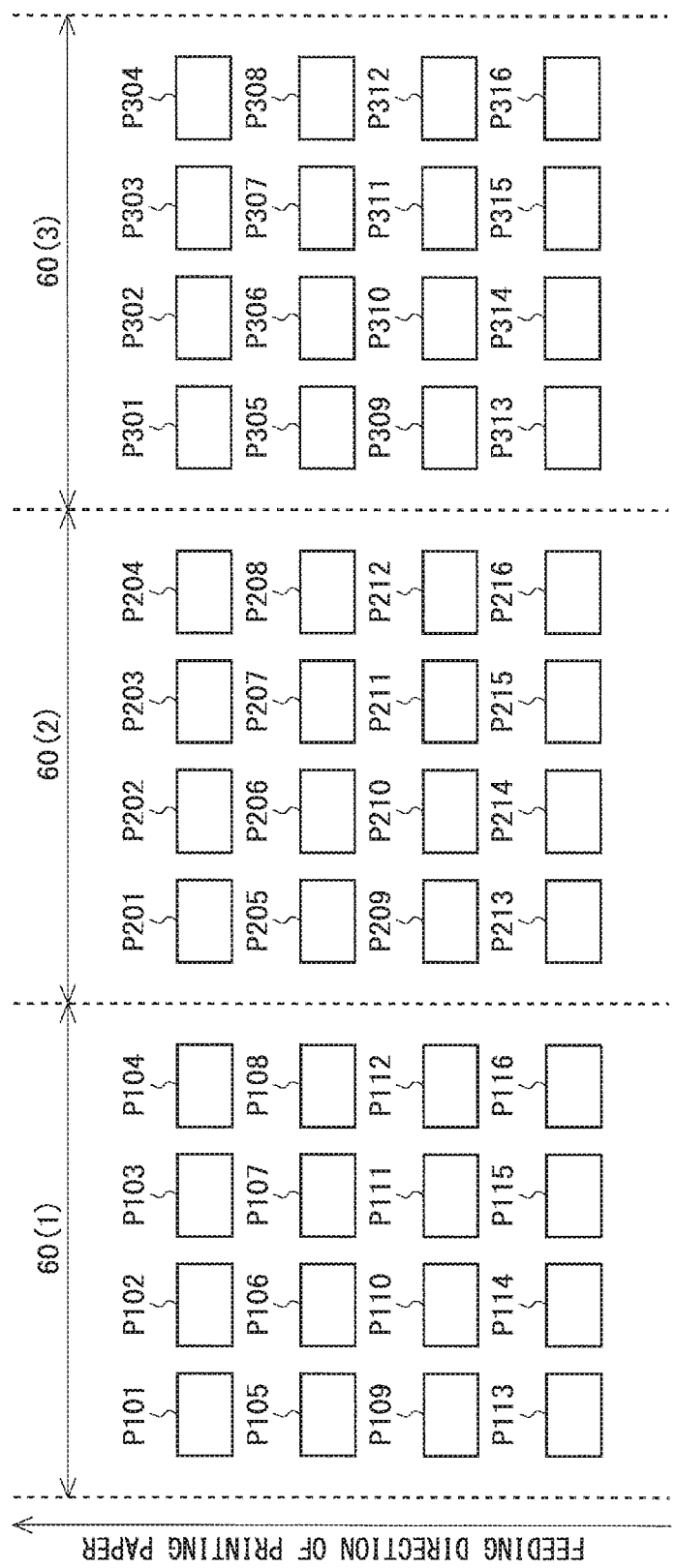
FIG. 14 is a view for illustration of patches included in a color chart in the embodiment.

Here, it is assumed that the entire region of the color chart is divided into three regions 60(1) to 60(3), as shown in FIG. 14. The color charts (the reference chart and the adjustment chart) include a plurality of patches P101 to P116, P201 to P216, and P301 to P316. The patches P101 to P116 are included in the region 60(1). The ink-jet heads 125 that print out the patches P101 to P116 are referred to as a "first head group". The patches P201 to P216 are included in the region 60(2). The ink-jet heads 125 that print out the patches P201 to P216 are referred to as a "second head group". The patches P301 to P316 are included in the region 60(3). The ink-jet heads 125 that print out the patches P301 to P316 are referred to as a "third head group". Each of the first to the third head groups is constituted by ink-jet heads of four ink colors (C, N, Y, and K). A color number is assigned to each of the ink colors. For example, a color number C1 is assigned to C, a color number C2 is assigned to N, a color number C3 is assigned to Y, and a color number C4 is assigned to K. Under the above assumption, the process is performed as stated below.

First, based on the determination result in the Step S200 of FIG. 8, setting of an abnormal region Rx is performed (Step S300). Further, the segmented regions other than the abnormal region out of the entire region of the color chart are set as normal regions Rrest (Step S310). After the above setting has been performed, the color number C1 is set as a color number Cn (Step S320). An ink color specified by the color number Cn corresponds to a target ink color.

Figure 15:
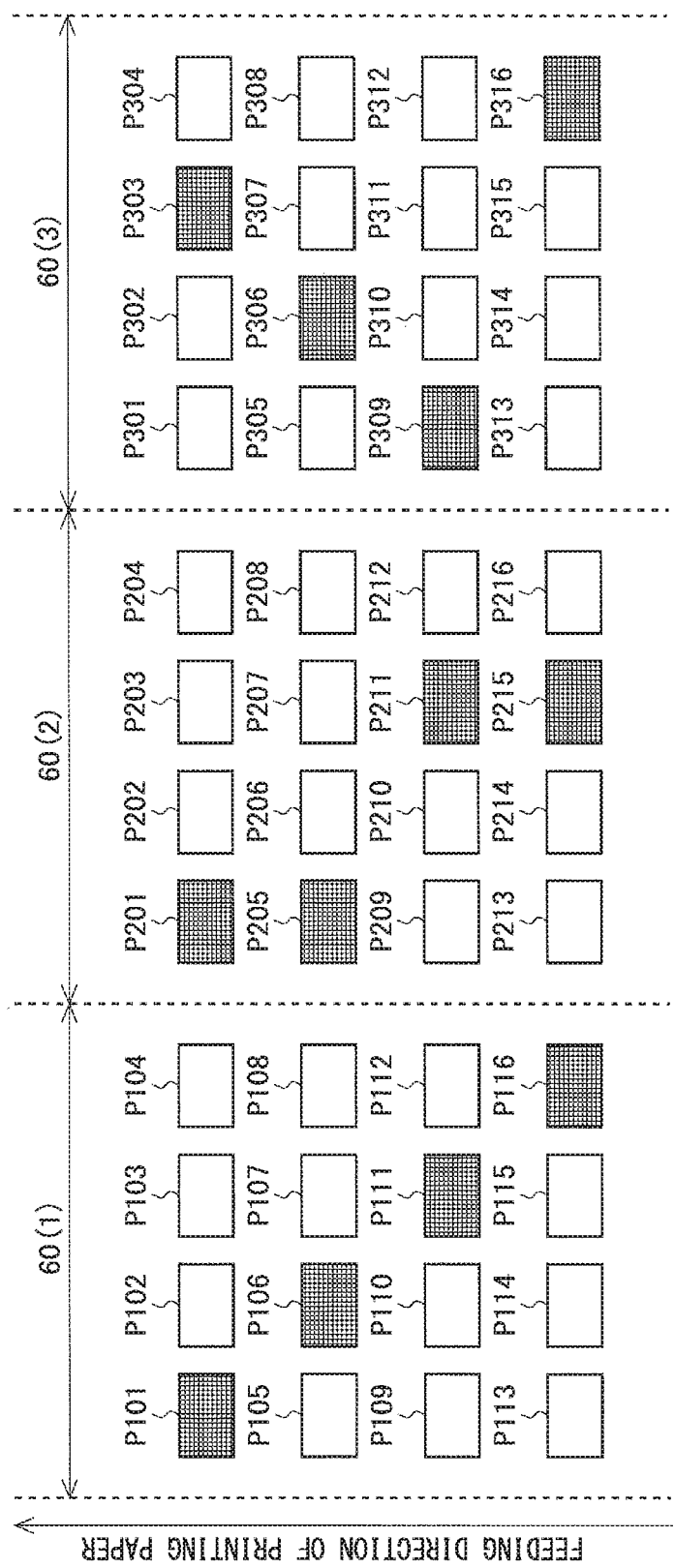
FIG. 15 is a view for illustration of patches included in the color chart in the embodiment.

Next, from the plurality of patches included in the reference chart, a patch group That is included in the abnormal region Rx and that does not contain a color component of the color number Cn (hereinafter referred to as a "first patch group") is extracted (Step S330). Then, from the plurality of patches included in the adjustment chart, a patch group that is included in the abnormal region Rx and that does not contain a color component of the color number Cn (hereinafter referred to as a "second patch group") is extracted (Step S340). Here, it assumed that the region 60(1) is set to be the abnormal region Rx, and that the patches P101, P106, P111, and P116 shaded in FIG. 15 are printed using an ink other than C color (that is, any of MYK, MY, MK, YK, M, Y, and K). At this time, the patches P101, P106, P111, and P116 are extracted from the reference chart in the Step S330 of the first time, and the patches P101, P106, P111, and P116 are extracted from the adjustment chart in the Step S340 of the first time. It should be noted that patches printed using an ink other than M color are extracted in the Steps S330 and S340 of the second time, patches printed using an ink other than Y color are extracted in the Steps S330 and S340 of the third time, and patches printed using an ink other than K color are extracted in the Steps S330 and S340 of the fourth time.

Regarding the above example, for the abnormal region Rx (the region 60(1)), if the heads of C color has no abnormality, and any of the heads of M color, Y color, and K color has an abnormality, it is considered that the respective color differences between the colorimetric values of the patches P101, P106, P111, and P116 of the reference chart and the colorimetric values of the patches P101, P106, P111, and P116 of the adjustment chart are relatively large. On the other hand, for the abnormal region Rx (the region 60(1)), if the heads of M color, color, and K color have no abnormality, and the heads of C color have an abnormality, it is considered that the respective color differences between the colorimetric values of the patches P101, P106, P111, and P116 of the adjustment chart and the colorimetric values of the patches P101, P106, P111, and P116 of the reference chart are extremely small.

Therefore, in the Step S350, based on the colorimetric values of the first patch group and the colorimetric values of the second patch group, an average value of the color differences in the abnormal region Rx is calculated as an abnormal region color difference.

Next, from the plurality of patches included in the reference chart, a patch group that is included in the normal region Rrest and that does not contain a color component of the color number Cn (hereinafter referred to as a "third patch group") is extracted (Step S360). Then, from the plurality of patches included in the adjustment chart, a patch group that is included in the normal region Rrest and that does not contain a color component of the color number Cn (hereinafter referred to as a "fourth patch group") is extracted (Step 70). Here, it is assumed that out of the patches included in the region 60(2) and the region 60(3), the patches P201, P205, P211, P215, P303, P306, P309, and P316 shaded in FIG. 15 are printed using an ink other than C color. Therefore, the patches P201, P205, P211, P215, P303, P306, P309, and P316 are extracted from the reference chart in the Step S360 of the first time, and the patches P201, P205, P211, P215, P303, P306, P309, and P316 are extracted from the adjustment chart in the Step S370 of the first time.

Next, based on the colorimetric of the third patch group and the colorimetric values of the fourth patch group, an average value of the color differences in the normal region Rrest is calculated as a normal region color difference (Step S380).

Thereafter, a difference value between the abnormal region color difference calculated in the Step S350 and the normal region color difference calculated in the Step S380 is calculated as an abnormality determination difference value (Step S390). Then, it is determined whether or not the abnormality determination difference is value calculated for every ink color (Step S400). In the Step S400, if 1t is determined that the abnormality determination difference value is calculated for every ink color, the process proceeds to Step S420, and if there is an ink color whose abnormality determination difference value is not yet calculated, the process proceeds to Step S410.

In the Step S410, the color number Cn+1 is set as the color number Cn. After the Step S410 is completed, the process returns to the Step S330, and the process in and after the Step S330 is repeated until the abnormality determination difference value is calculated for every ink color.

In the Step S420, a minimum value is selected from the abnormality determination difference values for all ink colors (in this embodiment, the abnormality determination difference value for C color, the abnormality determination difference value for N color, the abnormality determination difference value for Y color, and the abnormality determination difference value for K color), and an ink color corresponding to this minimum value is specified as abnormal ink color. For example, if the abnormality determination difference value for C color is the minimum value, it is determined that "the heads for colors other than C color have no abnormality, and the heads for C color have abnormality". After the Step S420 is completed, the process proceeds to the Step S230 in FIG. 8.

It should be noted, in this embodiment, a first patch group extracting step is realized by the Step S330, a second patch group extracting step is realized by the Step S340, an abnormal region color difference calculating step is realized by the Step S350, a third patch group extracting step is realized by the Step S360, a fourth patch group extracting step is realized by the Step S370, a normal region color difference calculating step is realized by the Step S380, and an abnormality determination difference value calculating step is realized by the Step S390.

5. EFFECTS

According to this embodiment, when performing the color matching process, the entire region of the color chart is divided into the plurality of regions so that boundaries between the segmented regions are parallel to the feeding direction of the printing paper, and then, the average color difference (the average color difference between the colorimetric values obtained by colorimetry of the reference chart and the colorimetric values obtained by colorimetry of the adjustment chart) is determined for each of the segmented regions. Then, a segmented region having a minimum average color difference is set to the reference region, and difference values of the average color differences between the reference region and each of the segmented regions other than the reference region are calculated. Based on the difference values, it is possible to determine whether or not there is an abnormality of the head, without requiring determination based on experiences of the user. With this, it is possible to determine whether the color matching process should be performed or the printer (the adjustment target device 101) itself should be adjusted, more accurately as compared to the conventional example. As a result, a color matching method capable of preventing unnecessarily execution of the color matching process when there is an abnormality in the head.

6. MODIFIED EXAMPLE

Hereinafter, modified examples of die above embodiment will be described.

6.1 Modified Examples Relating to the Method of Specifying an Abnormal Ink Color In the above embodiment, an abnormal ink color is specified based on the difference value between the normal region color difference and the abnormal region color difference. However, the present invention is not limited to this. In the following, two modified examples (a first modified example and a second modified example) relating to the method of specifying an abnormal ink color will be described.

6.1.1 First Modified Example

In this modified example, regarding a difference between colorimetric values obtained by colorimetry of the reference chart (the Step S110 of FIG. 8) and colorimetric values obtained by colorimetry of the adjustment chart (the Step S130 of FIG. 8), average values of differences of L* values, a* values, and b* values in a Lab color space for patches included in the abnormal region are determined as an L* value error dL, an a* value error da, and a b* value error db, respectively. Then, based on a maximum value out of the L* value error dL, the a* value error da, and the b* value error db, an abnormal ink color is specified as described later. It should be noted that, here, an average value of values obtained by subtracting the L value based on the colorimetric value obtained by colorimetry of the reference chart from the L* value based on the colorimetric value obtained by colorimetry of the adjustment chart is taken as the L* value error dL. This also applies to the a* value error da and the b* value error db.

FIG. 16 is a graph for illustration of a relationship between the L* value error dL, the a* value error da, and the b* value error db, and amounts of used ink of four ink colors. For example, a portion indicated by a reference number 71 in FIG. 16 represents that the a* value error da is much larger to a positive side in a case in which an amount of M color ink used by the adjustment target device 101 is greater than intended. Further, a portion indicated by a reference number 72 in FIG. 16 represents that the L* value error dL is slightly larger to the positive side in a case in which an amount of Y color ink used by the adjustment target device 101 smaller than intended. Moreover, a portion indicated by a reference number 73 in FIG. 16 represents that the L* value error dL is slightly larger to a negative side in a case in which an amount of C color ink used by the adjustment target device 101 is greater than intended. Furthermore, a portion indicated by a reference number 74 in FIG. 16 represents that the b* value error db is much larger to the negative side in a case in which an amount of Y color ink used by the adjustment target device 101 is smaller than intended. It should be noted that portions indicated by question marks in FIG. 16 represent that magnitudes of corresponding errors are not determined.

In the meantime, the L* value in the Lab color space is associated with brightness. Therefore, whether an amount of K color ink used is large or small affects the L* value error dL to a large extent. Further, in a case in which the a* value error da is a negative value, a result of printing by the adjustment target device 101 shows a greenish tone as compared to a targeted color (that is, larger amounts of C color and color inks are used), and in a case in which the a* value error da is a positive value, a result of printing by the adjustment target device 101 shows a tone of magenta as compared to a targeted color (that is, a larger amount of M color ink used). Moreover, in a case in which the b* value error db is a negative value, a result of printing by the adjustment target device 101 shows a bluish tone as compared to a targeted color (that is, a larger amount of C color ink is used), and in a case in which the b* value error db is a positive value, a result of printing by the adjustment target device 101 shows a yellowish tone as compared to a targeted color (that is, a larger amount of Y color ink is used).

From the above, in this modified example, an abnormal ink color is specified as described below, based on the L* value error dL, the a* value error da, and the b* value error db. It should be noted that determination on the maximum error among the L* value error dL, the ak value error da, and the b* value error db is made based on respective absolute values.

(A) If the L* value error dL is maximum, K color is specified as an abnormal ink color.

(B) If the a* value error da is maximum, M color is specified as an abnormal ink color. However, if a difference between the a* value error da and the b* value error db is equal to or smaller than a predetermined threshold value, C color is specified as an abnormal ink color.

(C) If the bk value error db is maximum, and the bk value error db is a negative value, C color is specified as an abnormal ink color when the a* value error da is a negative value, and Y color is specified as an abnormal ink color when the a* value error da is a positive value.

(C) If the b* value error db is maximum, and the b* value error db is a positive value, C color is specified as an abnormal ink color when the a* value error da is a positive value, and Y color is specified as an abnormal ink color when the a* value error da is a negative value.

6.1.2 Second Modified Example

Figure 18:
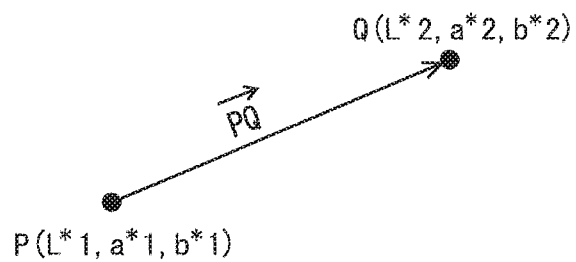
FIG. 18 is a diagram for illustration of a coordinate point P, a coordinate point Q, and a vector PQ in the second modified example of the embodiment.
Figure 19:
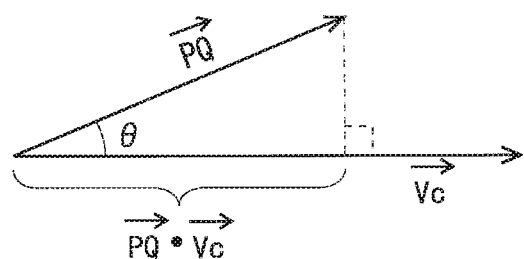
FIG. 19 is a diagram for illustration of an inner product of the vector PQ and a vector arc in the second modified example of the embodiment.
Figure 20:
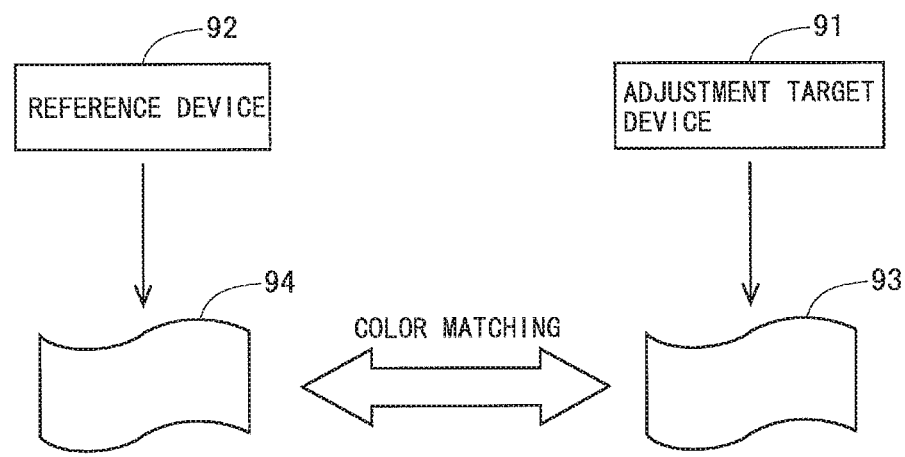
FIG. 20 is a diagram for illustration of color matching in relation to the prior art.
Figure 21:
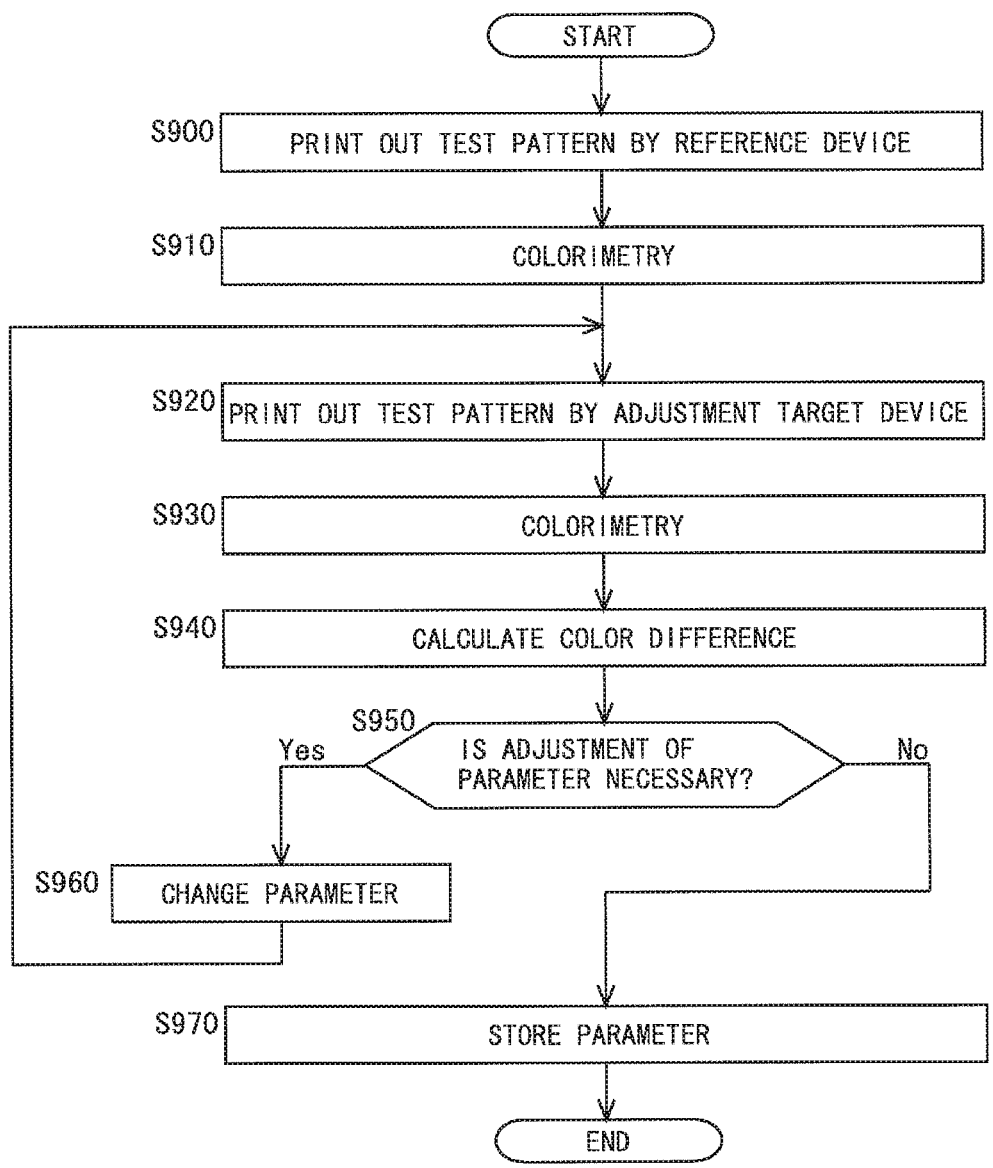
FIG. 21 is a flowchart showing a procedure of conventional color matching using color matching software in relation to the prior art.

In this modified example, an abnormal ink color is specified using an inner product of vectors in the Lab color space. Hereinafter, detailed explanation is given with reference to FIG. 17 through FIG. 19.

Figure 17:
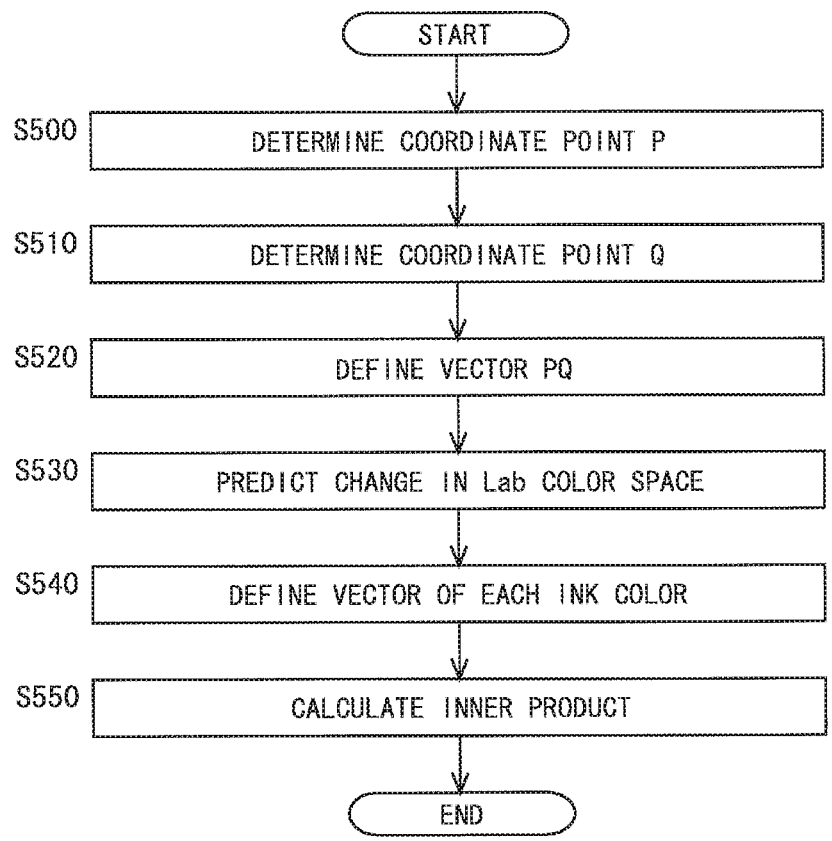
FIG. 17 is a flowchart showing a procedure for specifying an abnormal ink color in a second modified example in the embodiment.

FIG. 17 is a flowchart showing a procedure for specifying an abnormal ink color in this modified example. First, based on the colorimetric values obtained by colorimetry of the reference chart (the Step S110 of FIG. 8), a coordinate point P specified by each of the average values of the L* values, the a* values, and the b* values in the Lab color space is determined for the above-described abnormal region (Step S500). Regarding this coordinate point P, in FIG. 18, the average value of the L* values is represented by L*1, the average value of the a* values is represented by a*1, and the average value of the b* values is represented by b*1.

Next, based on the colorimetric values obtained by colorimetry of the adjustment chart (the Step S130 of FIG. 8), a coordinate point Q specified by each of the average values of the L* values, the a* values, and the b* values in the Lab color space is determined for the above-described abnormal region (Step S510). Regarding this coordinate point Q, in FIG. 18, the average value of the L* values is represented by L*2, the average value of the a* values is represented by a*2, and the average value of the b* values is represented by b*2.

Next, a vector PQ taking the coordinate point P as a starting point and taking the coordinate point Q as an ending point is defined (cf. FIG. 18) (Step S520). Then, based on information of a relationship between amounts of C color ink, M color ink, Y color ink, and K color ink and the L* value, the a* value, and the b* value included in an ICC profile for the adjustment target device, a process for predicting changes of the L* value, the a* value, and the b* value in the Lab color space with respect to changes in used amounts of C color ink, M color ink, Y color ink, and K color ink is performed (Step S30). Then, based on a prediction result, the vector of each of the ink colors is defined (Step S540). At this time, adjustment is made so that the vector of each of the ink colors becomes a unit vector.

In the meantime, the vector PQ is considered to represent a color difference. Further, an inner product of two vectors represents a degree of similarity of the two vectors. Moreover, the vectors of all ink colors are set to be the same magnitude (here, unit vector). Therefore, by calculating an inner product of the vector of each of the ink colors and the vector PQ, it is possible to determine that an ink color corresponding to a maximum value out of obtained inner products is a cause leading to an increased color difference. It should be noted that, when the vector of any ink color is defined as a vector Vc, and an angle between the vector PQ and the vector Vc is θ, if Vc is a unit vector, an inner product of the vector PQ and the vector Vc is represented by an equation (1) as can be seen from FIG. 19.

$$\vec{PQ} \cdot \vec{Vc} = |\vec{PQ}||\vec{Vc}| \cos \theta \quad (1)$$
$$= |\vec{PQ}| \cos \theta$$

In view of the above description, in the Step S550, an inner product of the vector of each of the ink colors and the vector PQ are calculated. Then, an ink color corresponding to a maximum value among absolute values of the calculated inner products is specified as an abnormal ink color.

It should be noted that in this modified example, a first coordinate point specifying step is realized by the Step S500, a second coordinate point specifying step is realized by the Step S510, a color difference vector defining step is realized by the Step S520, a change predicting step is realized by the Step S530, an ink color vector defining step is realized by the Step S540, and an inner product calculating step is realized by the Step S550.

6.2 Modified Examples Relating to a Process After Specifying Abnormal Head

In the above embodiment, a notification screen relating to the abnormality is displayed in the display unit 26 (the Step S230 of FIG. 8) after specifying an abnormal head (the Step S220 of FIG. 8). However, the present invention is not limited to this. In the following, two modified examples (a third modified example and a fourth modified example) relating to a process after specifying an abnormal head will be described.

6.2.1 Third Modified Example

In this modified example, after specifying an abnormal head, a cleaning process of the abnormal head is automatically performed, in place of or in addition to displaying a notification screen. Specifically, a cleaning step for automatically carrying a head specified in the Step S220 (a head for abnormal ink color) among the heads corresponding to the abnormal region is added to the process shown in FIG. 8. According to this modified example, as the abnormal head is automatically cleaned, it is possible to reduce time for color matching.

6.2.2 Fourth Modified Example

In this modified example, after specifying an abnormal head, a shading compensation process is automatically performed such that an amount of ink discharged from an abnormal head is adjusted, in place of or in addition to displaying a notification screen. Specifically, a shading step for automatically performing the shading compensation process such that an amount of ink discharged from a head specified in the Step S220 (a head for abnormal ink color) among the heads corresponding to the abnormal region is added to the process shown in FIG. 8. According to this modified example, as the shading compensation process is automatically performed when there is an abnormality in the head, it is possible to reduce time for color matching.

6.3 Modified Example Relating to Setting of Reference Region

In the above embodiment, an average color difference (an average value of color differences between the two color charts) is calculated for each segmented region, and a segmented region corresponding to a minimum value out of the calculated average color differences is set to the reference region. However, the present invention is not limited to this. Therefore, a modified example relating to setting of a reference region will be described below.

6.3.1 Fifth Modified Example

In this modified example, the number of patches whose color difference is equal to or greater than a predetermined threshold value (second threshold value) is determined for each segmented region. Then, a segmented region in which the number of such patches is smallest is set to the reference region.

6.3.2 Supplement

Regarding setting of the reference region, it is possible to employ a method different from the embodiment and the fifth modified example. Specifically, it is sufficient that in the Step S170 of FIG. 8, some representative value relating to a color difference that is a difference between the colorimetric values obtained by colorimetry of the reference chart and the colorimetric values obtained by colorimetry of the adjustment chart is determined for each segmented region. Further, is sufficient that in the Step S180 of FIG. 8, a segmented region whose representative value is minimum is taken as the reference region, and for each of the segmented regions other than the reference region, a difference value of the representative value is calculated to the reference region.

7. OTHERS

Although the present invention has been described above in detail, but the above description is exemplary in all aspects and not restrictive. It is understood that a numerous number of modifications and alterations are conceivable without departing from the scope of the present invention.

For example, while the above embodiment described the configuration of the ink-jet printing device 100 using water-based inks (cf. FIG. 3), the present invention may also be applied to a case in which an ink-jet printing device using UV inks (ultraviolet curing ink) such as an ink-jet printing device for label printing is employed. Further, the base material is not limited to paper, and the present invention may be applied to any base material as long as an image can be formed by discharging inks thereon. For example, the present invention may also be applied to a case in which thin-film synthetic resin film or fabric is employed as a base material. Moreover, the present invention may be applied to a printer of a method other than the ink-jet type (e.g., offset printer).

It should be noted that the present application claims priority based on Japanese Patent Application No. 2019-149442 titled "COLOR MATCHING METHOD AND COLOR MATCHING PROGRAM", filed on Aug. 16, 2019, and the contents of which are herein incorporated by reference.

What is claimed is:

1. A color matching method for performing color matching between a reference device and an adjustment target device using color charts including a plurality of patches, the reference device being an ink-jet type printer, the adjustment target device being an ink-jet type printer having a plurality of heads arranged in a width direction vertical to a feeding direction of a base material, the method comprising:
   a first colorimetry step of performing colorimetry of a first color chart outputted from the reference device;
   a second colorimetry step of performing colorimetry of a second color chart outputted from the adjustment target device;
   a representative value determination step of determining, for each of segmented regions obtained by dividing a region of an entire color chart into a plurality of regions so that each of boundaries of the segmented regions is parallel to the feeding direction of the base material, a representative value relating to color difference that is a difference between colorimetric values obtained in the first colorimetry step and colorimetric values obtained in the second colorimetry step;
   a difference value calculating step of, taking a segmented region whose representative value is minimum as a reference region, calculating difference values of representative values between the reference region and each of the segmented regions other than the reference region; and
   an abnormal region specifying step of, based on the difference values calculated in the difference value calculating step, specifying an abnormal region in which abnormality of a head of the adjustment target device is occurring, wherein
   the segmented regions are set based on a position of the width direction of the plurality of heads, and
   in the abnormal region specifying step, a segmented region whose difference value calculated in the difference value calculating step is equal to or greater than a first threshold value is specified as the abnormal region.

2. The color matching method according to claim 1, wherein the representative value determined in the representative value determination step is an average value of the color differences for patches included in each of the segmented regions.

3. The color matching method according to claim 1, wherein the representative value determined in the representative value determination step is the number of patches whose color difference is equal to or greater than second threshold value among patches included in each of the segmented regions.

4. The color matching method according to claim 1, further comprising notification step of notifying abnormality of the adjustment target device by explicitly showing the abnormal region specified in the abnormal region specifying step.

5. The color matching method according to claim 1, wherein the adjustment target device includes the plurality of heads for each ink color, and
   the method further comprising an abnormal ink color specifying step of specifying an ink color of a head, out of heads corresponding to the abnormal region, in which abnormality is occurring as an abnormal ink color.

6. The color matching method according to claim 5, further comprising a cleaning step of automatically performing cleaning of a head for the abnormal ink color specified in the abnormal ink color specifying step.

7. The color matching method according to claim 5, further comprising a shading step of automatically performing shading compensation process such that an amount of ink discharged from a head for the abnormal ink color specified in the abnormal ink color specifying step is adjusted.

8. The color matching method according to claim 1, wherein each of the plurality of heads provided for the adjustment target device includes a nozzle array for discharging an ink for each ink color, and
   the method comprising an abnormal ink color specifying step of specifying an ink color of a nozzle array, out of nozzle arrays included in a head corresponding to the abnormal region, in which abnormality is occurring as an abnormal ink color.

9. The color matching method according to claim 5, wherein
   the abnormal ink color specifying step includes:
      a first patch group extracting step of extracting a first patch group from the plurality of patches included in the first color chart, the first patch group being a set of patches included in the abnormal region, the set of patches not containing a component of a target ink color;
      a second patch group extracting step of extracting a second patch group from the plurality of patches included in the second color chart, the second patch group being a set of patches included in the abnormal region, the set of patches not containing a component of a target ink color;
      an abnormal region color difference calculating step of calculating an average value of color differences in the abnormal region based on calorimetric values of the first patch group and colorimetric values of the second patch group;

a third patch group extracting step of extracting a third patch group from the plurality of patches included in the first color chart, the third patch group being a set of patches included in a normal region that is a segmented region other than the abnormal region, the set of patches not containing a component of a target ink color;

a fourth patch group extracting step of extracting a fourth patch group from the plurality of patches included in the second color chart, the fourth patch group being a set of patches included in the normal region, the set of patches not containing a component of a target ink color;

a normal region color difference calculating step of calculating an average value of color differences in the normal region based on colorimetric values of the third patch group and colorimetric values of the fourth patch group; and an abnormality determination difference value calculating step calculating, as an abnormality determination difference value, a difference value between the average value calculated in the abnormal region color difference calculating step and the average value calculated in the normal region color difference calculating step, all of ink colors are taken as a target ink color one by one, and a sequence of process including the first patch group extracting step, the second patch group extracting step, the abnormal region color difference calculating step, the third patch group extracting step, the fourth patch group extracting step, the normal region color difference calculating step, and the abnormality determination difference value calculating step is performed for all of the ink colors, and an ink color corresponding to a minimum value of the abnormality determination difference value calculated in the abnormality determination difference value calculating step is specified as the abnormal ink color.

10. The color matching method according to claim 5, wherein in the abnormal ink color specifying step, regarding the difference between the colorimetric values obtained in the first colorimetry step and the colorimetric values obtained in the second colorimetry step, average values of differences of L* values, a* values, and b* values in a Lab color space for patches included in the abnormal region are determined as an Lk value error, an a* value error, and a b* value error, respectively, and the abnormal ink color is specified based on a maximum value out of the L* value error, the a* value error, and the b* value error.

11. The color matching method according to claim wherein the abnormal ink color specifying step includes:
a first coordinate point specifying step of determining a coordinate point P specified by each of the average values of L* values, a* values, and b* values in a Lab color space for patches included in the abnormal region, based on the colorimetric values obtained in the first colorimetry step;

a second coordinate point specifying step of determining a coordinate point Q specified by each of the average values of the L* values, the a* values, and the b* values in the Lab color space for patches included in the abnormal region, based on the colorimetric values obtained in the second colorimetry step;

a color difference vector defining step of defining a vector PQ having a starting point at the coordinate point P and an ending point at the coordinate point Q;

a change predicting step of predicting each of the changes of the L* values, the a* values, and the b* values in the Lab color space with respect to a change of each of the ink colors, using an ICC profile;

an ink color vector defining step of defining a vector of each of the ink colors based on a prediction result obtained in the change predicting step; and an inner product calculating step of calculating an inner product of the vectors of each of the ink colors and the vector PQ, and an ink color corresponding to a maximum value among absolute values of inner products calculated in the inner product calculating step is specified as the abnormal ink color.

12. A non-transitory computer-readable recording medium having a color matching program recorded therein, the color matching program being for performing color matching between a reference device and an adjustment target device using color charts including a plurality of patches, the reference device being an ink-jet type printer, the adjustment target device being an ink-jet type printer having a plurality of heads arranged in a width direction vertical to a feeding direction of a base material, wherein the color matching program causes a computer to execute:

a representative value determination step of determining, for each of segmented regions obtained by dividing a region of an entire color chart into a plurality of regions so that each of boundaries of the segmented regions is parallel to the feeding direction of the base material, a representative value relating to color difference that is a difference between colorimetric values obtained by colorimetry of a first color chart outputted from the reference device and colorimetric values obtained by colorimetry of a second color chart outputted from the adjustment target device;

a difference value calculating step of, taking a segmented region whose representative value is minimum as a reference region, calculating difference values of representative values between the reference region and each of the segmented regions other than the reference region; and an abnormal region specifying step of, based on the difference values calculated in the difference value calculating step, specifying an abnormal region in which abnormality of a head of the adjustment target device is occurring, the segmented regions are set based on a position of the width direction of the plurality of heads, and in the abnormal region specifying step, a segmented region whose difference value calculated in the difference value calculating step is equal to or greater than a first threshold value is specified as the abnormal region.

* * * * *